Patented Sept. 3, 1946

2,407,071

UNITED STATES PATENT OFFICE 2,407,071

THICK PASTING STARCH AND METHOD

Lowell O. Gill and John W. McDonald, Decatur, Ill., assignors to A. E. Staley Manufacturing Co., Decatur, Ill., a corporation of Delaware No Drawing. Application November 12, 1943, Serial No. 510,068

8 Claims. (Cl. 260—9)

This invention relates to improvements in the manufacture of starch. More particularly, it pertains to the manufacture of a thick pasting starch which is a reaction product between starch and a water-soluble resin or a resin-forming material, and the provision of such a product and process for its manufacture is a particular object of the invention.

When starches are heated with water to approximately the boiling point of water, the starch granules swell, more or less of the water is bound, and the suspension assumes a gelatinous character. Starches from different sources produce pastes with different characteristics, and one of the most important differences from the standpoint of use is a difference in viscosity. Some commercial starches, notably tapioca and potato, produce pastes when heated with water, which are a great deal more viscous than equal concentrations of starches from other sources, for example, corn.

There are many applications where increased viscosity over that produced by the native starch would be desirable, but heretofore, although several methods for producing starches which are thinner boiling than the native starches have been developed, very little has been known about means to increase the viscosity of native starch.

Specifically, an object of the invention is the provision of a composition of matter which is a reaction product of starch and a small amount of a water-soluble, heat-reactive resin or resin-forming material which has as an essential characteristic the property of forming a thick pasting mass when heated with water.

Other objects of the invention will in part be obvious and will in part appear hereinafter.

Our invention is based on the discovery that the viscosity of thick boiling starch can be increased greatly by reacting it under carefully controlled conditions with small amounts of urea-formaldehyde polymer, dimethylol urea, or with polymers resulting from the urea-formaldehyde reaction, or other water-soluble or water dispersible resin-forming material, e. g. melamine-formaldehyde monomer. Resin ordinarily has no effect upon a starch paste when merely mixed with the starch and the mixture cooked with water, unless the proportion of resin is high enough to dilute the starch and cause the paste to become thin.

Briefly, the invention comprises suspending native starch in water to form a starch milk, adjusting the pH to between 1.5 and 7.0, preferably heating to about 125° F., adding 0.005 to 2.0 per cent dimethylol urea, or resin, by weight on the basis of the starch, and continuing the stirring and heating about 5 hours. Viscosity determination can be made at this time. The reaction product may then be adjusted if necessary to a pH above 4.5, filtered, washed, and dried. At the preferred pH of the reaction product (4.5–7.0) the suspension does not need to be adjusted but can be filtered directly.

It will be observed that the effectiveness of the foregoing treatment decreases as the pH is carried above about 6.5, and above about 8 pH there is no increase in viscosity, even when large quantities of resin are used. Ordinarily the combination of low pH and relatively high resin content has a tendency to retard gelatinization of the starch to a degree which makes some such combinations impractical, but the resin content and the pH can be so regulated by following the principles of the present invention that practical products can be made at any pH within the range claimed.

The temperature of 125° F. is arbitrary, based on the fact that the reaction is speeded up at the higher temperature and that other commercial starch modifications are carried on at that temperature. Any temperature between room temperature (70° F.) and one somewhat below the gelatinization temperature of the starch will be suitable. For a given viscosity and pH, the time will vary more or less inversely with the temperature. However, it is possible to regulate the pH, amount of resin or resin-forming material, and temperature in such a way that the slurry can be filtered immediately after mixing, depending upon the heat of drying or long aging at lower temperature to complete the reaction. Dry starch mixed with the proper amount of resin in solution and redried, if necessary, also produces a thick boiling product. We prefer to complete the reaction before filtering because of the relative ease of control.

Viscosity determinations were made as follows: Weighed an amount of starch to be tested equivalent to 13.2 grams of dry starch and transferred it to a 600 cc. copper beaker. (This was 15 grams of 12 per cent moisture starch. A variation of moisture requires a correction in the amount of starch used.)

Measured out 280 cc. of distilled water and added enough to the starch in the beaker to make a paste by stirring, then added the rest of the 280 cc. of water. Stirred until all the starch was in suspension.

Placed the beaker in a closely fitting boiling water bath. The total cooking time during which the beaker was in the bath was 15 minutes. The bath stopped boiling when the beaker was first placed in it, but boiled again within 3 minutes. When first placed in the bath, the starch was stirred with a glass rod, at the rate of about 150 revolutions per minute for 5 minutes. The beaker was covered with a watch glass. At the end of exactly 5 more minutes, the cover was raised and held above the starch so that any water on the bottom of it drained into the beaker, and the contents stirred for 15 seconds. The cover was replaced. Then, 15 seconds after the expiration of the boiling period, the cover was raised as before and stirred until the beaker was removed from the bath. 200 cc. of the paste was quickly poured into a Scott cup which was in a boiling water bath. The volume was measured by a marker soldered into the cup. The plug was raised and with a stop watch the exact time was observed which it takes for 50 cc. of the paste to run out of the orifice in the bottom of the cup into a 50 cc. graduated cylinder.

The number of seconds may be reported as the Scott test.

Native corn starch has a viscosity of about 70 by this method.

*Example No. 1*

| | Parts |
|---|---|
| Native corn starch | 100 |
| Water | 100 |
| Dimethylol urea | 0.2 |

The above was stirred and heated to 125° F. The pH was 4.5. After 5 hours treatment, the suspension was filtered, washed and dried. The viscosity was 320.

*Example No. 2*

| | Parts |
|---|---|
| Native corn starch | 100 |
| Water | 100 |
| Dimethylol urea adjusted to pH 6.0 | 0.5 |

The above was heated for 5 hours to 125° F., filtered, washed, and dried. The viscosity was more than 1000.

*Example No. 3*

| | Parts |
|---|---|
| Native corn starch | 100 |
| Water | 100 |
| Urea-formaldehyde water-soluble polymer | 0.5 |

This was heated to 120° F. for 5 hours, filtered, washed and dried. The viscosity was 490.

*Example No. 4*

| | Parts |
|---|---|
| Native corn starch | 100 |
| Water | 100 |
| Melamine-formaldehyde monomer | 0.2 |

The above was heated to 125° F. for 5 hours, filtered, washed and dried. The viscosity of the product was 250.

*Example No. 5*

| | Parts |
|---|---|
| Native corn starch | 100 |
| Water | 100 |
| Dimethylol urea | 0.2 |

The above was heated to 125° F., filtered immediately, and dried. The viscosity was 300.

*Example No. 6*

| | Parts |
|---|---|
| Tapioca starch | 100 |
| Water | 100 |
| Dimethylol urea | 0.05 |

The above was heated to 125° F. for 5 hours, filtered, washed and dried. The Scott viscosity of the original starch was 253. It was raised to 600 by this treatment.

*Example No. 7*

| | Parts |
|---|---|
| Native corn starch (12 per cent moisture) | 100 |
| Dimethylol urea dissolved in 1 lb. water | 0.2 |

This viscosity was 300 after two weeks storage.

The present invention is particularly advantageous because it is simply and easily practiced, the degree of modification readily can be controlled, and the product can be made either very thick or only slightly thicker than native starch and with any desired intermediate graduations.

Since certain changes in carrying out the above process, and certain modifications in the product which embody the invention may be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process of making a composition of matter, which comprises reacting native starch in aqueous suspension having a pH of 1.5 to 7.0 with 0.005 to 2.0 per cent of dimethylol-urea based on the weight of the starch, adjusting the pH of the suspension to a value within the range of 4.5 to 7.0, filtering the suspension, and drying the insoluble reaction product to recover a dry granular composition, said composition having the characteristic of being thicker pasting with hot water than the original starch and forming therewith a smooth homogeneous paste.

2. A dry granular composition of matter comprising a reaction product of native starch and dimethlylol-urea prepared in accordance with the process set forth in claim 1.

3. A process of making a composition of matter which can be converted into a smooth homogeneous thick pasting mass when heated with water, comprising suspending native starch in water to form a starch milk, adjusting the pH of the starch milk to a value within the range of 4.5 to 7.0, adding to the starch milk dimethylol-urea in the proportion of 0.005 to 2.0 parts per 100 parts of starch, heating the mixture for about 5 hours at a temperature of about 125° F., and filtering the suspension and drying the insoluble reaction product to recover a dry granular composition.

4. A dry granular composition of matter comprising a reaction product of native starch and dimethylol-urea prepared in accordance with the process set forth in claim 3.

5. A process of making a composition of matter, which comprises reacting native starch in aqueous suspension having a pH of 1.5 to 7.0 with 0.005 to 2.0 per cent of a material selected from the class consisting of water soluble urea-formaldehyde condensation products and water soluble melamine-formaldehyde condensation products based on the weight of the starch, adjusting the pH of the suspension to a value within the range of 4.5 to 7.0, filtering the suspension, and drying the insoluble reaction product to recover a dry granular composition, said composition having the characteristic of being thicker pasting with hot water than the original starch and forming therewith a smooth homogeneous paste.

6. A dry granular composition of matter comprising a reaction product of native starch and a material selected from the class consisting of water soluble urea-formaldehyde condensation products and water soluble melamine-formaldehyde condensation products prepared in accordance with the process set forth in claim 5.

7. A process of making a composition of matter which can be converted into a smooth homogeneous thick pasting mass when heated with water, comprising suspending native starch in water to form a starch milk, adjusting the pH of the starch milk to a value within the range of 4.5 to 7.0, adding to the starch milk a material selected from the class consisting of water soluble urea-formaldehyde condensation products and water soluble melamine-formaldehyde condensation products in the proportion of 0.005 to 2.0 parts per 100 parts of starch, heating the mixture for about 5 hours at a temperature of about 125° F., and filtering the suspension and drying the insoluble reaction product to recover a dry granular composition.

8. A dry granular composition of matter comprising a reaction product of native starch and a material selected from the class consisting of water soluble urea-formaldehyde condensation products and water soluble melamine-formaldehyde condensation products prepared in accordance with the process set forth in claim 7.

LOWELL O. GILL.
JOHN W. McDONALD.